(12) United States Patent
Jonouchi et al.

(10) Patent No.: US 9,695,730 B2
(45) Date of Patent: Jul. 4, 2017

(54) EXHAUST GAS PURIFYING DEVICE

(71) Applicant: Yanmar Co., Ltd., Osaka-shi, Osaka (JP)

(72) Inventors: Katsunari Jonouchi, Osaka (JP); Tomohiro Fukuda, Osaka (JP); Yusuke Amari, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 14/901,625

(22) PCT Filed: Jun. 30, 2014

(86) PCT No.: PCT/JP2014/067447
§ 371 (c)(1),
(2) Date: Dec. 28, 2015

(87) PCT Pub. No.: WO2014/208771
PCT Pub. Date: Dec. 31, 2014

(65) Prior Publication Data
US 2016/0369681 A1   Dec. 22, 2016

(30) Foreign Application Priority Data

Jun. 28, 2013 (JP) ................. 2013-136757

(51) Int. Cl.
| | |
|---|---|
| F01N 3/00 | (2006.01) |
| F01N 9/00 | (2006.01) |
| F01N 3/023 | (2006.01) |
| F01N 3/10 | (2006.01) |
| B01D 53/90 | (2006.01) |
| B01D 53/94 | (2006.01) |
| F01N 3/035 | (2006.01) |
| F01N 3/025 | (2006.01) |
| F02D 41/02 | (2006.01) |
| F02D 41/40 | (2006.01) |

(52) U.S. Cl.
CPC ............ F01N 9/002 (2013.01); B01D 53/90 (2013.01); B01D 53/944 (2013.01);
(Continued)

(58) Field of Classification Search
CPC ........ F01N 9/002; F01N 3/0253; F01N 3/035; F01N 3/103
See application file for complete search history.

(56) References Cited

U.S. PATENT DOCUMENTS

2006/0260299 A1* 11/2006 Wang ................ F01N 3/035
                                                    60/297
2007/0039311 A1* 2/2007 Pfaeffle ................ F01N 3/023
                                                    60/274

(Continued)

FOREIGN PATENT DOCUMENTS

| JP | 2005-113752 A | 4/2005 |
|---|---|---|
| JP | 2008-133764 A | 6/2006 |

(Continued)

OTHER PUBLICATIONS

Translation of JP2005113752, Hiranuma Satoshi; Apr. 28, 2005.*
(Continued)

*Primary Examiner* — Jesse Bogue
(74) *Attorney, Agent, or Firm* — Crowell & Moring LLP

(57) ABSTRACT

An exhaust gas purifying apparatus includes an oxidative catalyst and a filter that are disposed in an exhaust gas path of an engine; a fuel injecting device that injects fuel according to a fuel injection pattern; and a control device that estimates a deposition amount of a particulate matter and sets the fuel injection pattern. When the fuel injection pattern including post-injection is set to recover the filter, the fuel injection pattern is set such that a post-injection amount is reduced as the deposition amount increases.

4 Claims, 8 Drawing Sheets

(52) U.S. Cl.
CPC ..... *B01D 53/9477* (2013.01); *B01D 53/9495*
(2013.01); *F01N 3/023* (2013.01); ***F01N
3/0253* (2013.01); *F01N 3/035*** (2013.01);
*F01N 3/103* (2013.01); *F01N 3/106*
(2013.01); *F02D 41/029* (2013.01); ***F02D
41/405*** (2013.01); *B01D 2251/208* (2013.01);
*B01D 2258/012* (2013.01); *F01N 3/025*
(2013.01); *F01N 2240/36* (2013.01); *F01N
2250/02* (2013.01); *F01N 2430/085* (2013.01);
*F01N 2900/1606* (2013.01); *F02D 41/025*
(2013.01); *F02D 41/0245* (2013.01); *F02D
41/402* (2013.01); *F02D 2200/0812* (2013.01);
*Y02T 10/44* (2013.01)

(56) References Cited

U.S. PATENT DOCUMENTS

| | | | | |
|---|---|---|---|---|
| 2008/0098724 | A1* | 5/2008 | Konstandopoulos | F01N 3/0222 60/278 |
| 2011/0162620 | A1* | 7/2011 | Bidner | F02D 41/0025 123/299 |
| 2012/0285139 | A1* | 11/2012 | Geyer | F01N 3/0885 60/274 |
| 2013/0086890 | A1 | 4/2013 | Noma et al. | |
| 2013/0104529 | A1 | 5/2013 | Takayanagi et al. | |

FOREIGN PATENT DOCUMENTS

| | | |
|---|---|---|
| JP | 2010-174794 A | 8/2010 |
| JP | 2011-252435 A | 12/2011 |
| JP | 2012-92759 A | 5/2012 |

OTHER PUBLICATIONS

Translation of JP2010174794, Hotta Tomoyuki; Aug. 12, 2010.*
International Preliminary Report on Patentability (PCT/IB/338 & PCT/IB/373) issued in PCT Application No. PCT/JP2014/067447 dated Dec. 29, 2015, including English translation of the Written Opinion (PCT/ISA/237) dated Sep. 30, 2014 (seven (7) pages).
International Search Report (PCT/ISA/210) issued in PCT Application No. PCT/JP2014/067447 dated Sep. 30, 2014, with English translation (four (4) pages).

* cited by examiner

Fig. 4

| CONTROL MODES | | APPARATUS CONDITIONS | | | | | RECOVERY TYPE | AIMED TEMPERATURE | RECOVERY TRIGGER START | WORK PERMITTED/ NOT-PERMITTED |
|---|---|---|---|---|---|---|---|---|---|---|
| | | EGR | INTAKE AIR REDUCTION | MAIN INJECTION TIMING | AFTER-INJECTION | POST-INJECTION | | | | |
| SELF-RECOVERY | | USABLE | NON-USE | ORDINARY | NON-USE | NON-USE | NO₂ RECOVERY (LOW TEMPERATURE RECOVERY) | — | AUTOMATICALLY | WORK PERMITTED (ROTATION VELOCITY IS VARIABLE) |
| ASSIST RECOVERY | | NON-USE | USE | RETARDING | USE | NON-USE | | ASSIST AIMED TEMPERATURE (CATALYST ENTRANCE TEMPERATURE) | AUTOMATICALLY | WORK PERMITTED (ROTATION VELOCITY IS VARIABLE) |
| RESET RECOVERY | | NON-USE | USE | RETARDING | USE | USE (INJECTION AMOUNT: LARGE) | O₂ RECOVERY (HIGH TEMPERATURE RECOVERY) | RESET AIMED TEMPERATURE (FILTER ENTRANCE TEMPERATURE) | AUTOMATICALLY | WORK PERMITTED (ROTATION VELOCITY IS VARIABLE) |
| STATIONARY STAND-BY | | | | | | | | | | |
| STATIONARY RECOVERY | | NON-USE | USE | RETARDING | USE | USE (INJECTION AMOUNT: LARGE) | O₂ RECOVERY (HIGH TEMPERATURE RECOVERY) | STATIONARY AIMED TEMPERATURE (FILTER ENTRANCE TEMPERATURE) | MANUALLY | WORK NOT-PERMITTED (ROTATION VELOCITY IS MAINTAINED) |
| RECOVERY STAND-BY | | | | | | | | | | |
| RECOVERING RECOVERY | WEAK RECOVERY | NON-USE | USE | RETARDING | USE | USE (INJECTION AMOUNT: SMALL) | NO₂ + O₂ RECOVERY | RECOVERY AIMED TEMPERATURE (FILTER ENTRANCE TEMPERATURE) | MANUALLY | WORK NOT-PERMITTED (ROTATION VELOCITY IS MAINTAINED) |
| | STRONG RECOVERY | NON-USE | USE | RETARDING | USE | USE (INJECTION AMOUNT: LARGE) | O₂ RECOVERY (HIGH TEMPERATURE RECOVERY) | STATIONARY AIMED TEMPERATURE (FILTER ENTRANCE TEMPERATURE) | AUTOMATICALLY | WORK NOT-PERMITTED (ROTATION VELOCITY IS MAINTAINED) |

EXHAUST GAS PURIFYING DEVICE

TECHNICAL FIELD

The present invention relates to an exhaust gas purifying apparatus including an oxidative catalyst and a filter that are disposed in an exhaust gas path of an engine, an fuel injecting device that injects fuel according to a fuel injection pattern, and a control device that is configured to estimate a deposition amount of a particulate matter and set the fuel injection pattern.

BACKGROUND ART

A diesel particulate trapping filter including an oxidative catalyst and a filter has traditionally been known. Patent Document 1 also discloses an example of an exhaust gas purifying apparatus that includes the diesel particulate trapping filter.

The exhaust gas purifying apparatus is configured to activate the oxidative catalyst by increasing the temperature of the exhaust gas. When the oxidative catalyst is activated, the oxides of nitrogen in the exhaust gas are oxidized to produce nitrogen dioxide. Because nitrogen dioxide has a strong oxidizing action, the PM (particulate matter) on the filter is oxidized and removed. To increase the temperature of the exhaust gas, exhaust gas reduction, intake air reduction, delaying of the main injection timing, and the like are conducted. In addition to the above control, the exhaust gas purifying apparatus is configured to further increase the temperature of the exhaust gas entering the filter (a filter entrance temperature) by supplying the fuel to the activated oxidative catalyst using post-injection. When the filter entrance temperature exceeds the combustion temperature of the PM (400° C.), the PM on the filter is oxidized and removed by oxygen in the exhaust gas. Compared to the oxidization by nitrogen dioxide, the combustion with oxygen can quickly remove the PM. The temperature of the exhaust gas is therefore increased using the post-injection when the filter is caused to completely recover.

PATENT DOCUMENT

Patent Document 1: JP 2011-252435 A

SUMMARY OF THE INVENTION

Problems to be Solved by the Invention

The inventors found the following problems. The speed of the recovery of the filter becomes high as the filter entrance temperature becomes high. The PM on the filter may however combust in a chain reaction when the filter entrance temperature is maintained at a high temperature in the case where the deposition amount of the PM trapped by the filter is excessive. This chain-reaction combustion is called "rapid recovery". A large amount of heat is generated associated with the rapid recovery and the filter may be melted or broken by the large amount of heat.

Because the rapid recovery is the combustion with oxygen, this combustion does not occur as far as the filter entrance temperature does not exceed the combustion temperature. It is therefore considered that, when the deposition amount is excessive, the initial exhaust gas temperature (the temperature of the exhaust gas produced in the combustion chamber) is controlled such that the filter entrance temperature does not exceed the combustion temperature. In this case, however, the filter is recovered not by the combustion with oxygen but only by oxidation by nitrogen dioxide. In this case, only the oxidation by nitrogen dioxide cannot recover the filter in a shot time. A long time period (for example, one day) is therefore necessary to recover the filter.

Though the large amount of heat is more easily generated in the filter as the deposition amount is increased, a long time period is necessary to recover the filter when the filter entrance temperature is suppressed regardless of the deposition amount.

An object of the present invention is to provide an exhaust gas purifying apparatus capable of efficiently recovering the filter suppressing any generation of the large amount of heat in the filter.

Means for Solving Problems

In order to solve the problems inherent in the conventional art, an exhaust gas purifying apparatus comprises an oxidative catalyst and a filter that are disposed in an exhaust gas path of an engine; a fuel injecting device that injects fuel according to a fuel injection pattern; and a control device that is configured to estimate a deposition amount of a particulate matter, the control device setting the fuel injection pattern, wherein when the fuel injection pattern including post-injection is set to recover the filter, the fuel injection pattern is set such that a post-injection amount is reduced as the deposition amount increases.

In the exhaust gas purifying apparatus, the post-injection amount is set to be a weak injection amount when the deposition amount is larger than a reference threshold value, and the post-injection amount is set to be a strong injection amount that is larger than the weak injection amount when the deposition amount is equal to the reference threshold value or smaller.

In the exhaust gas purifying apparatus, when the fuel injection pattern is set after the deposition amount exceeds a starting threshold value that is larger than the reference threshold value, the fuel injection pattern is set such that the post-injection amount is reduced as the deposition amount increases, and when the fuel injection pattern is set before the deposition amount exceeds the starting threshold value, the post-injection amount is maintained at a constant value regardless of magnitude of the deposition amount.

In the exhaust gas purifying apparatus, when the deposition amount is equal to a limit threshold value or larger, that is larger than the starting threshold value, the post-injection is prohibited.

In the exhaust gas purifying apparatus, wherein the post-injection amount is set such that a time period necessary for the deposition amount to be reduced from the starting threshold value to the reference threshold value is within three hours.

The exhaust gas purifying apparatus of the present invention can be described as follows. The exhaust gas purifying apparatus included in the present invention includes:

a fuel injecting device that injects fuel;

an oxidative catalyst and a filter that are disposed in an exhaust gas path;

a storing unit that has plural fuel injection patterns stored therein and that has each of the plural fuel injection patterns correlating the pattern with conditions under which injection sessions are conducted in the fuel injection pattern; and a control device that can estimate a deposition amount of a particulate matter depositing on the filter, that selects one fuel injection pattern from the plural fuel injection patterns based on information stored in the storing unit, and that causes the fuel injecting device to conduct fuel injection sessions in the one fuel injection pattern, wherein the plural fuel injection patterns include a first post-injection presence pattern that conducts post-injection, wherein the first post-injection presence pattern is adapted to cause an injection amount of the post-injection to vary based on the deposition amount of the particulate matter estimated by the control device, and wherein the deposition amount of the particulate matter estimated by the control device when a strong injection amount is injected in the post injection is smaller than the deposition amount of the particulate matter estimated by the control device when a weak injection amount is injected that is smaller than the strong injection amount in the post-injection.

The plural fuel injection patterns may include a number to be any natural number, of first post-injection presence pattern(s). In each of the first post-injection presence patterns, a number to be any natural number, of injection amount(s) capable of being injected in the post-injection and different from each other may be present or, in the first post-injection presence pattern, an infinite number of injection amounts capable of being injected in the post-injection and different from each other may consecutively be present.

In one embodiment, when the deposition amount estimated by the control device is larger than a reference threshold value or is equal to the reference threshold value or larger, the weak injection amount of fuel is injected and, on the other hand, when the deposition amount estimated by the control device is equal to the reference threshold value or smaller, or is smaller than the reference threshold, the strong injection amount of fuel is injected.

The case corresponding to the case where the deposition amount estimated by the control device is larger than the reference threshold value is the case where the deposition amount estimated by the control device is equal to the reference threshold value or smaller. The case corresponding to the case where the deposition amount estimated by the control device is equal to the reference threshold value or larger is the case where the deposition amount estimated by the control device is smaller than the reference threshold.

In one embodiment, the plural fuel injection patterns include a second post-injection presence pattern that conducts the post-injection, wherein the second post-injection presence pattern is adapted to vary the injection amount of the post-injection based on the deposition amount of the particulate matter estimated in the control device when the deposition amount estimated by the control device is larger than a starting threshold value that is larger than the reference threshold value or is equal to the starting threshold value or larger, wherein the deposition amount of the particulate matter estimated by the control device when a large injection amount is injected in the post-injection is smaller than the deposition amount of the particulate matter estimated by the control device when a small injection amount smaller than the large injection amount is injected in the post-injection and, on the other hand, the injection amount of the post-injection is constant when the deposition amount estimated by the control device is equal to the starting threshold value or smaller, or is smaller than the starting threshold value.

The case corresponding to the case where the deposition amount estimated by the control device is larger than the starting threshold value that is larger than the reference threshold value is the case where the deposition amount estimated by the control device is equal to the starting threshold value or smaller. The case corresponding to the case where the deposition amount estimated by the control device is equal to the starting threshold value or larger that is larger than the reference threshold value is the case where the deposition amount estimated by the control device is smaller than the starting threshold value.

In one embodiment, when the deposition amount estimated by the control device is larger than a limit threshold value that is larger than the starting threshold value, the control device selects from the plural fuel injection patterns a fuel injection pattern that does not include the post-injection, and causes the fuel injecting device to conduct injection sessions in the fuel injection pattern that does not include the post-injection.

In one embodiment, the deposition amount is reduced from the starting threshold value to the reference threshold value within three hours in the post-injection of each of all the fuel injection patterns selected when the deposition amount is equal to the starting threshold value or larger.

Effect of the Invention

The exhaust gas purifying apparatus according to the present invention can efficiently recover the filter suppressing any generation of the large amount of heat in the filter.

BRIEF DESCRIPTION OF DRAWING(S)

FIG. 4 is a diagram of a list of control modes.

EMBODIMENT(S) FOR CARRYING OUT THE INVENTION

A diesel engine 1 mounting thereon an exhaust gas purifying apparatus according to this embodiment will be described with reference to the drawings. The diesel engine (hereinafter, referred to as "engine") 1 is connected to a driving mechanism 100. The driving mechanism 100 represents a travelling apparatus and/or a working apparatus driven by the engine 1. The engine 1 and the driving mechanism 100 are mounted on a working vehicle like, for example, a backhoe or a tractor.

Figure 1:
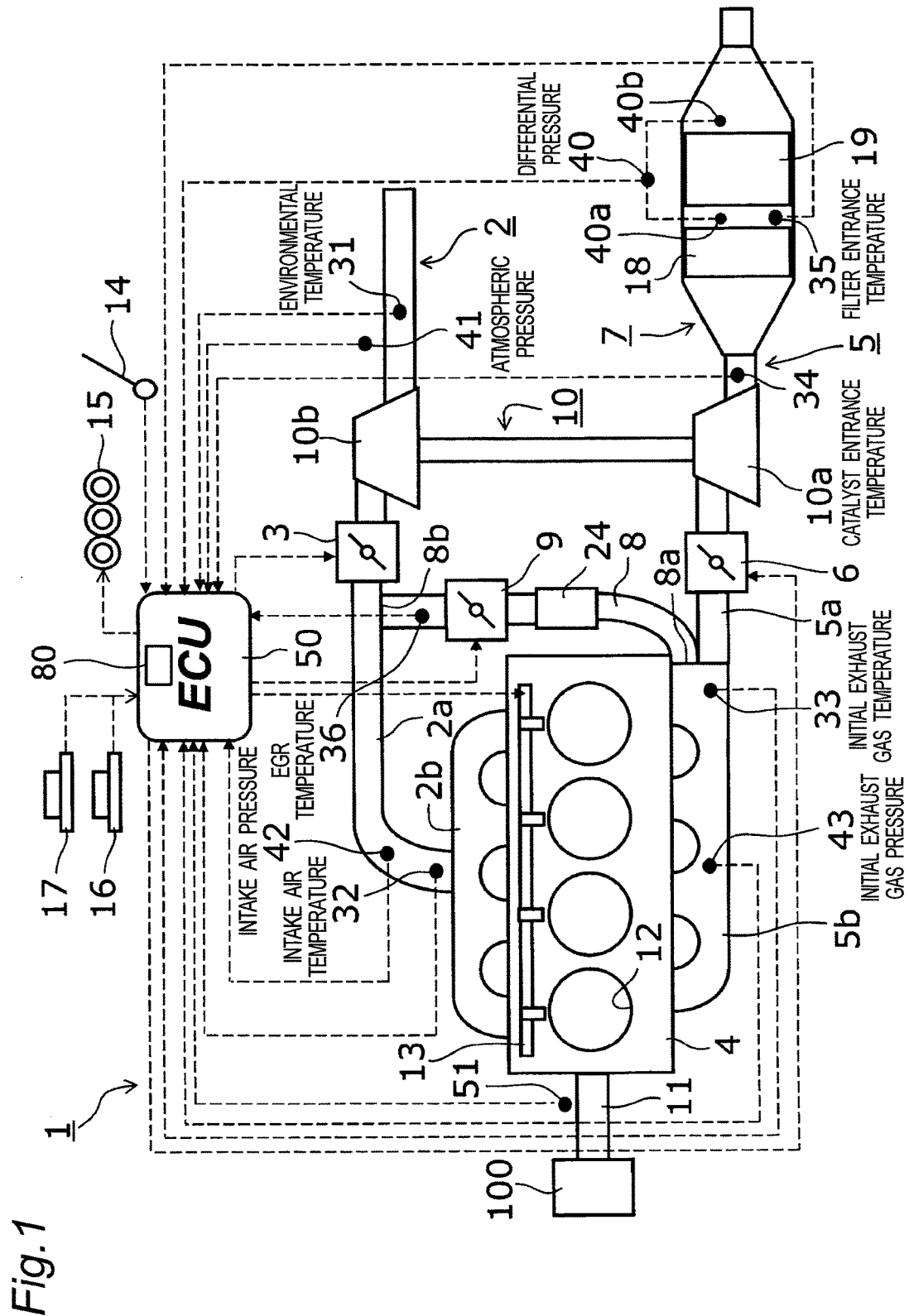
FIG. 1 is a diagram of a configuration of an engine according to this embodiment.

FIG. 1 is a diagram of a configuration of the engine 1 according to this embodiment. The engine 1 includes an intake air path 2, an intake air throttle valve 3, a cylinder block 4, an exhaust gas path 5, an exhaust gas throttle valve 6, a filter unit 7, an EGR pipe 8, an EGR throttle valve 9, a supercharger 10, a crank shaft 11, and a fuel injecting device 13.

The engine 1 is a four-cylinder engine and the cylinder block 4 includes four combustion chambers 12. The intake air path 2 includes an intake air pipe 2a that is externally opened and an intake air manifold 2b that connects the intake air pipe 2a to the four combustion chambers 12. The external air (intake air) is introduced into the combustion chambers 12 through the intake air path 2. The intake air throttle valve 3 is disposed in the intake air pipe 2*a* and varies the degree of opening of the intake air path 2. The exhaust gas path 5 includes an exhaust gas pipe 5*a* that is externally opened and an exhaust gas manifold 5*b* that connects the four combustion chambers 12 to the exhaust gas pipe 5*a*. The exhaust gas is discharged from the combustion chambers 12 to the atmosphere through the exhaust gas path 5. The exhaust gas throttle valve 6 is disposed in the exhaust gas pipe 5*a* and varies the degree of opening of the exhaust gas path 5. The EGR pipe (an EGR path) 8 connects the exhaust gas path 5 to the intake air path 2. A portion of the exhaust gas is introduced into the intake air path 2 through the EGR pipe 8 and joins the intake air. The EGR throttle valve 9 is disposed in the EGR pipe 8 and varies the degree of opening of the EGR pipe 8. The engine 1 also includes an EGR cooler 24. The EGR cooler 24 is disposed in the EGR pipe 8 on the downstream side of the EGR throttle valve 9. The supercharger 10 includes an exhaust gas turbine 10*a* disposed in the exhaust gas pipe 5*a*, and a compressor 10*b* disposed in the intake air pipe 2*a*. The fuel injecting device 13 employs a common rail scheme. The fuel injecting device 13 supplies the fuel to the combustion chambers 12 according to a fuel injection pattern.

The filter unit 7 is disposed in the exhaust gas path 5. The filter unit 7 is a diesel particulate trapping filter and includes an oxidative catalyst 18 and a filter 19. The oxidative catalyst 18 is disposed on the upstream side of the filter 19 in the exhaust gas path 5. When the exhaust gas is discharged along the exhaust gas path 5, the exhaust gas passes through the oxidative catalyst 18 and passes thereafter through the filter 19. The PM (particulate matter) included in the exhaust gas is trapped by the filter 19.

As depicted in FIG. 1, the engine 1 includes an ECU 50, a rotation velocity input device 14, a warning device 15, a stationary recovery button 16, and a recovering recovery button 17. The engine also includes an operational unit for a user (an operator) to output an instruction signal from the exterior to the ECU 50. The rotation velocity input device 14, the stationary recovery button 16, and the recovering recovery button 17 are included in the operational unit.

The ECU (a control device) 50 is configured to control the various types of device that relate to the driving of the engine 1.

The rotation velocity input device 14 is an operational device to specify an aimed rotation velocity. In this embodiment, the rotation velocity input device 14 is configured by an acceleration bar group to vary the driving state of the engine 1.

The warning device 15 plays the role of providing various types of warning to the operator. In this embodiment, the warning device 15 includes many lamp groups each capable of displaying plural different types of warning.

The stationary recovery button 16 is an input device that issues an order to change the control mode to a stationary recovery mode (a stationary recovery mode order) by a manual input operation. The recovering recovery button 17 is an input device that issues an order to change the control mode to a recovering recovery mode (a recovering recovery order) by a manual input operation. Both of the stationary recovery button 16 and the recovering recovery button 17 are each a push-button and each can specify an order "present" state and an order "absent" state. The contents of the control modes will be described later.

As depicted in FIG. 1, the engine 1 includes an environmental temperature sensor 31, an intake air temperature sensor 32, an initial exhaust gas temperature sensor 33, a catalyst entrance temperature sensor 34, a filter entrance temperature sensor 35, and an EGR temperature sensor 36. The environmental temperature sensor 31 detects the temperature of the intake air in the intake air path 2 (an environmental temperature) on the upstream side of the compressor 10*b* and an exit 8*b* of the EGR pipe 8. The intake air temperature sensor 32 detects the temperature of the intake air in the intake air path 2 (an intake air temperature) on the downstream side of the compressor 10*b* and the exit 8*b* of the EGR pipe 8. The initial exhaust gas temperature sensor 33 detects the temperature of the exhaust gas in the exhaust gas path 5 (an initial exhaust gas temperature) on the upstream side of the exhaust gas throttle valve 6, the exhaust gas turbine 10*a*, and an entrance 8*a* of the EGR pipe 8. The catalyst entrance temperature sensor 34 detects the temperature of the exhaust gas in the exhaust gas path 5 (a catalyst entrance temperature) on the downstream side of the exhaust gas throttle valve 6 and the exhaust gas turbine 10*a*, and on the upstream side of the oxidative catalyst 18. The filter entrance temperature sensor 35 detects the temperature of the exhaust gas in the exhaust gas path 5 (a filter entrance temperature) on the downstream side of the oxidative catalyst 18 and on the upstream side of the filter 19. The EGR temperature sensor 36 detects the temperature of the exhaust gas in the EGR pipe 8 (an EGR temperature) on the downstream side of the EGR cooler 24 and the EGR throttle valve 9.

As depicted in FIG. 1, the engine 1 includes a differential pressure sensor 40, an atmospheric pressure sensor 41, an intake air pressure sensor 42, and an initial exhaust gas pressure sensor 43. The differential pressure sensor 40 includes a filter entrance pressure sensor 40*a* and a filter exit pressure sensor 40*b*. The filter entrance pressure sensor 40*a* detects the pressure in the exhaust gas path 5 on the downstream side of the oxidative catalyst 18 and on the upstream side of the filter 19. The filter exit pressure sensor 40*b* detects the pressure in the exhaust gas path 5 on the downstream side of the filter 19. The differential pressure sensor 40 detects the differential pressure between both sides of the filter 19 based on the pieces of detection information acquired by the filter entrance pressure sensor 40*a* and the filter exit pressure sensor 40*b*. The atmospheric pressure sensor 41 detects the pressure in the exterior of the engine 1 (the atmospheric pressure). The intake air pressure sensor 42 detects the pressure of the intake air in the intake air path 2 (an intake air pressure) on the downstream side of the compressor 10*b* and the exit 8*b* of the FGR pipe 8. The initial exhaust gas pressure sensor 43 detects the pressure of the exhaust gas in the exhaust gas path 5 (an initial exhaust gas pressure) on the upstream side of the exhaust gas throttle valve 6, the exhaust gas turbine 10*a*, and the entrance 8*a* of the EGR pipe 8.

As depicted in FIG. 1, the engine 1 includes a rotation velocity sensor 51. The rotation velocity sensor 51 detects the rotation velocity of the crank shaft 11 (an engine rotation velocity). FIG. 1 depicts plural arrows and each thereof indicates the direction of transmission or reception of a signal. As depicted in FIG. 1, such components are each adapted to output a signal to the ECU 50 as the environmental temperature sensor 31, the intake air temperature sensor 32, the initial exhaust gas temperature sensor 33, the catalyst entrance temperature sensor 34, the filter entrance temperature sensor 35, the EGR temperature sensor 36, the differential pressure sensor 40, the atmospheric pressure sensor 41, the intake air pressure sensor 42, the initial exhaust gas pressure sensor 43, the rotation velocity sensor

51, the rotation velocity input device 14, the stationary recovery button 16, and the recovering recovery button 17. The ECU 50 is adapted to output, based on one or more signal(s) of these signals, control signals to the intake air throttle valve 3, the exhaust gas throttle valve 6, the EGR throttle valve 9, the fuel injecting device 13, and the warning device 15. The ECU 50 is also adapted to control the degree of opening of each of the intake air throttle valve 3, the exhaust gas throttle valve 6, and the EGR throttle valve 9, controls the fuel injection pattern of the fuel injecting device 13, and causes the warning device 15 to properly transmit a warning.

Figure 2:
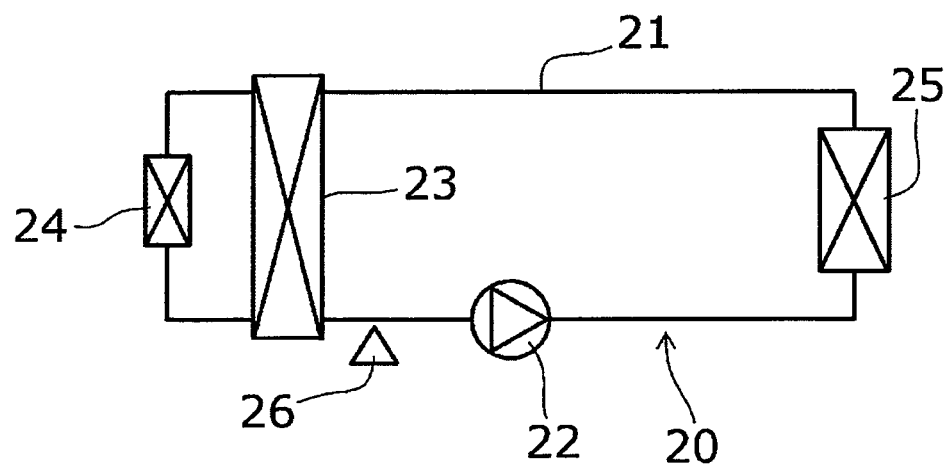
FIG. 2 is a diagram of a configuration of a cooling water circuit of the engine.

FIG. 2 is a diagram of a configuration of a cooling water circuit 20 of the engine 1. The cooling water circuit 20 includes a water path 21, a water pump 22, a water jacket 23, an EGR cooler 24, and a radiator 25. The water pump 22 causes cooling water of the engine 1 to flow along the water path 21. The water jacket 23 is disposed in the cylinder block 4. The engine 1 includes a water temperature sensor 26. The water temperature sensor 26 detects the temperature of the cooling water flowing through the water path 21 (a cooling water temperature) on the downstream side of the water jacket 23 and the upstream side of the radiator 25.

The estimation method for the deposition amount will be described. The "deposition amount" is the amount of the PM depositing on the filter 19. The ECU 50 can estimate the deposition amount based on two estimation methods. The two estimation methods are a calculation-based estimation method and a differential pressure-based estimation method.

The calculation-based estimation method is a method of estimating the deposition amount based on the operation conditions of the engine. In the calculation-based estimation method, the PM discharge amount and the PM recovery amount are estimated based on the operation conditions of the engine, and the deposition amount is estimated based on the acquired PM discharge amount and the acquired PM recovery amount. The PM discharge amount represents an amount of PM discharged from the engine 1 in a unit time period. The PM recovery amount represents an amount of PM removed from the filter 19 due to the recovery in a unit time period. The deposition amount is acquired by subtracting the PM recovery amount from the PM discharge amount. The PM discharge amount and the PM recovery amount are both estimated based on the operation conditions of the engine. The PM discharge amount is estimated basically based on the engine rotation velocity and the total injection amount of the fuel in one cycle. The PM recovery amount is estimated based on the flow rate of the exhaust gas and the filter entrance temperature detected by the filter entrance temperature sensor 35. The operation conditions of the engine are identified based on the group of temperatures detected by the temperature sensors 31 to 36, the group of pressures detected by the pressure sensors 41 to 45, the engine rotation velocity detected by the rotation velocity sensor 51, and the total injection amount injected from the fuel injecting device 13.

The differential pressure-based estimation method is a method of estimating the deposition amount based on the differential pressure between both sides of the filter 19. The clogging of the filter 19 becomes heavier and the differential pressure of the filter 19 is increased as the deposition amount increases. On the contrary, the differential pressure of the filter 19 is reduced as the deposition amount is reduced. According to the differential pressure-based estimation method, the deposition amount is estimated using the correlation between the differential pressure and the deposition amount. To be exact, the deposition amount is acquired by adding a correction based on the flow rate of the exhaust gas to the differential pressure acquired by the differential pressure sensor 40. The flow rate of the exhaust gas is estimated based on the operation conditions of the engine.

The recovery of the filter 19 will be described with reference to FIG. 3 to FIG. 8. The values of the various types of temperature (° C.) and the deposition amount (g/L) will be listed each in the parentheses in the following description while these values are only the values listed as an example of those realizable in this embodiment and other values are also realizable. The unit "g/L" of the deposition amount represents the weight of the PM per unit volume.

The recovery of the filter 19 is conducted by combustion of the PM with oxygen and oxidation of the PM by nitrogen dioxide. The PM depositing on the filter 19 is removed by the combustion or the oxidation. The combustion of the PM with oxygen represents combustion of the PM by auto-ignition thereof. The auto-ignition occurs when the temperature of the PM exceeds the combustion temperature of the PM (400° C.). Nitrogen dioxide functions as an oxidizer for the PM. When the temperature of the oxidative catalyst 18 exceeds a predetermined activation temperature (300° C.), the oxidative catalyst 18 is activated and highly active nitrogen dioxide is produced from the oxides of nitrogen in the exhaust gas. Because the filter 19 is disposed on the downstream side of the oxidative catalyst 18, nitrogen dioxide produced around the oxidative catalyst 18 passes through the filter 19. The PM depositing on the filter 19 therefore is oxidized and removed. When the catalyst entrance temperature becomes a high temperature (550° C.) or higher, no nitrogen dioxide is produced and the recovery is therefore conducted only by the combustion with oxygen.

When the catalyst entrance temperature is lower than the activation temperature, no oxidation by nitrogen dioxide and no combustion with oxygen occur. The engine 1 therefore conducts exhaust gas reduction and changes the fuel injection pattern to increase the catalyst entrance temperature.

Figure 3:
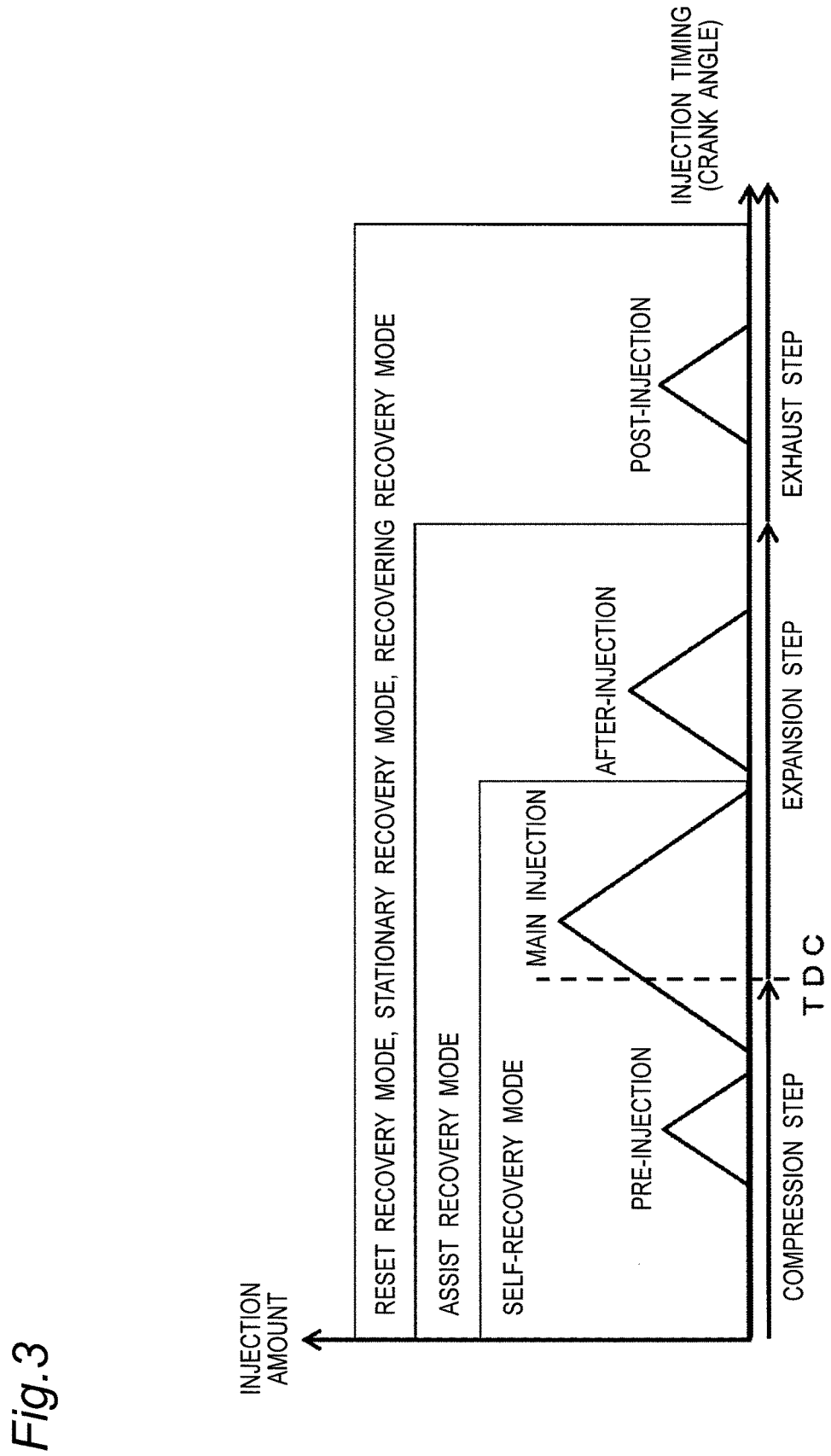
FIG. 3 is a diagram of an example of a fuel injection pattern.

FIG. 3 is a diagram of an example of the fuel injection pattern. In FIG. 3, the axis of abscissa represents the injection timing and the axis of ordinate represents the injection amount. The fuel injection pattern is the form of fuel injection sessions defined by the injection timings and the injection amounts. The fuel injection pattern depicted in FIG. 3 includes pre-injection, main injection, after-injection, and post-injection. The injection time period of the main injection includes a time period during which a piston is present at its top dead center (TDC). The "pre-injection", the "main injection", the "after-injection", and the "post-injection" are established as technical terms among those skilled in the art. The pre-injection, the main injection, the after-injection, and the post-injection can be defined, for example, as follows. The pre-injection is injection to secure the ignition property. The main injection is injection for the main combustion. The after-injection is injection to increase the catalyst entrance temperature. The post-injection is injection to increase the filter entrance temperature. The pre-injection is the injection to form the pilot flame and is effective for reduction of $NO_x$ and improvement of the combustion noises. The after-injection achieves an effect of completely combusting the unburned fuel, increases the exhaust gas temperature, and is effective for enabling the gas to efficiently be applied with the post-process. The post-injection increases the exhaust gas temperature and achieves an effect of enabling the gas to efficiently be applied with the post-process.

Because the load applied to the engine 1 is increased by causing the intake air throttle valve 3 to conduct the intake air reduction, the fuel injection amount (the main injection amount) is increased. As a result, the catalyst entrance temperature is increased. The total fuel injection amount can be increased by changing the fuel injection pattern to be conducted by the fuel injecting device 13 without increasing the torque. For example, retarding of the main injection and/or use of the after-injection is/are conducted. As a result, the filter entrance temperature is increased. In addition, when the fuel injection pattern is set to include the post-injection, the total fuel injection amount is further increased. In this case, the fuel supplied in the post-injection combusts with the oxidative catalyst 18 and the filter entrance temperature is significantly increased relative to the catalyst entrance temperature.

FIG. 4 is a diagram of a list of the control modes. The engine 1 is adapted to be able to select seven possible control modes. The seven control modes consists of a self-recovery mode, an assist recovery mode, a reset recovery mode, a stationary stand-by mode, a stationary recovery mode, a recovery stand-by mode, and a recovering recovery mode. During the start up of the engine 1, any one of the seven control modes is selected and the ECU 50 controls the engine 1 based on the selected control mode. For each of these control modes, control conditions, starting conditions, and ending conditions are set. The control conditions consists of configuration conditions for the fuel injection pattern, conditions for the reduction amount of the intake air reduction, and conditions for the aimed rotation velocity. The configuration conditions of the fuel injection pattern includes presence or absence of each of the pre-injection, the main injection, the after-injection, and the post-injection, and the injection amount and the injection timing of each of these injection sessions. The configuration of the aimed rotation velocity represents presence or absence of the aimed rotation velocity and the magnitude thereof.

The self-recovery mode is a control mode that causes no special control to be conducted to recover the filter 19. In the self-recovery mode, an ordinary operation is conducted. As depicted in FIG. 3, the fuel injection pattern in the self-recovery mode consists of the pre-injection and the main injection. When the catalyst entrance temperature becomes higher than the activation temperature during the ordinary operation (the self-recovery mode), the recovery of the filter 19 is automatically conducted.

The assist recovery mode is a control mode to recover the filter 19 without using any post-injection. In the assist recovery mode, the fuel injection pattern is set to increase the catalyst entrance temperature and the intake air reduction is used. As depicted in FIG. 3, the fuel injection pattern in the assist recovery mode consists of the pre-injection, the main injection, and the after-injection. The injection timing of the main injection in the assist recovery mode is delayed compared to the injection timing of the main injection in the self-recovery mode. The delay of the injection timing of the main injection and the use of the after-injection reduce the rate of the fuel amount that contributes to the generation of the torque and increase the rate of the fuel amount that contributes to the increase of the temperature. Because the intake air reduction increases the load applied to the engine 1, the amount of the main injection is increased. As depicted in FIG. 3, the main injection is conducted at a compression step and an expansion step. In the assist recovery mode, the total injection amount at the compression step and the expansion step is increased. The catalyst entrance temperature is therefore increased.

The assist recovery mode is set aiming at causing the catalyst entrance temperature to reach the assist aimed temperature (350° C.) that is higher than the activation temperature and that is lower than the combustion temperature. When the catalyst entrance temperature reaches the activation temperature, the filter 19 is mildly recovered. In the assist recovery mode, however, conducting the work is permitted and variation of the rotation velocity is assumed. When the rotation velocity is varied, the main injection amount is also varied and the catalyst entrance temperature is also varied. The catalyst entrance temperature does not therefore reach the assist aimed temperature when the rotation velocity is maintained to be low. As described above, the values each in the parentheses like "350° C." in the description for the assist aimed temperature (350° C.) are each only an example. The parameters each can take a value other than the value in the parentheses (hereinafter, the same will be applied).

The reset recovery mode is a control mode to quickly recover the filter 19 by using the post-injection. In the reset recovery mode, the fuel injection pattern is set to increase the filter entrance temperature and the intake air reduction is used. As depicted in FIG. 3, the fuel injection pattern in the reset recovery mode consists of the pre-injection, the main injection, the after-injection, and the post-injection. The control conditions of the reset recovery mode include use of the post-injection in addition to the control conditions of the assist recovery mode. The fuel combusts with the oxidative catalyst 18 when the post-injection is conducted in the case where the catalyst entrance temperature exceeds the activation temperature. As a result, the exhaust gas is further heated and the filter entrance temperature is further increased.

The reset recovery mode is set aiming at causing the filter entrance temperature to reach the reset aimed temperature (600° C.) that is higher than the combustion temperature such that the deposition amount becomes substantially zero. When the filter entrance temperature reaches the reset aimed temperature (600° C.), the filter 19 is recovered in a relatively short time period. Conducting the work is also permitted in the reset recovery mode and variation of the rotation velocity is assumed. The filter entrance temperature therefore does not reach the reset aimed temperature when the rotation velocity is maintained to be low.

Because the rotation velocity is not fixed as above in the self-recovery mode, the assist recovery mode, and the reset recovery mode, the catalyst entrance temperature or the filter entrance temperature may not excellently be increased. In this case, the filter 19 is not excellently recovered. The stationary recovery mode is therefore provided such that the filter 19 is securely recovered.

The stationary recovery mode is a control mode to quickly recover the filter 19 by maintaining the rotation velocity at a predetermined rotation velocity and using the post-injection. In the stationary recovery mode, the fuel injection pattern is set to increase the filter entrance temperature, the intake air reduction is used, and the aimed rotation velocity is maintained at the predetermined rotation velocity. In the stationary recovery mode, the rotation velocity is fixed in addition to the control conducted in the reset recovery mode. The predetermined rotation velocity is 2,200 rpm in this embodiment. The control conditions of the stationary recovery mode are set such that the filter entrance temperature reaches the stationary aimed temperature (600° C.) that is higher than the combustion temperature (400° C.). In this embodiment, the stationary aimed temperature is equal to the reset aimed temperature (600° C.).

In this embodiment, all the realizable fuel injection patterns are in advance input into and stored in an embedded memory 80 (see FIG. 1) of the ECU 50. Each of the fuel injection patterns is stored in the embedded memory 80 being correlated with the conditions under which injection sessions in the fuel injection pattern are conducted. The ECU 50 is adapted to receive the signals from the sensors and at least one signal of the signals from the operator, then refer to the information stored in the embedded memory 80, and select the fuel injection pattern that matches with the conditions indicated by the at least one signal. The ECU 50 is further adapted to control the fuel injecting device 13 such that the selected fuel injection pattern is realized. The embedded memory 80 constitutes a storing unit. The storing unit may not be constituted by the embedded memory of the ECU but may be constituted by a storing medium disposed outside the ECU.

Returning to the previous subject, when the filter entrance temperature becomes high, the rate of the reduction of the deposition amount is increased. The filter 19 may however be melted or broken when the filter entrance temperature becomes excessively high. The level of the stationary aimed temperature (600° C.) is therefore set such that the running time period of the stationary recovery mode is the predetermined time period H5a (30 minutes) that is a short time period. Similarly, the level of the reset aimed temperature is set such that the running time period of the reset recovery mode is also the predetermined time period (30 minutes) (this predetermined time period will hereinafter be referred to as "H3a").

The stationary stand-by mode is a control mode to stand by the running of the stationary recovery mode. When the recovery of the filter 19 is not excellently conducted in the self-recovery mode, the assist recovery mode, and the reset recovery mode, the stationary recovery mode needs to be run as above. The rotation velocity is however maintained at the predetermined rotation velocity in the stationary recovery mode. Sudden running of the stationary recovery mode during working causes sudden variation of the rotation velocity and is therefore unfavorable. The stationary stand-by mode is therefore provided to stand by until the operator inputs an order. In the stationary stand-by mode, the ECU 50 activates the warning device 15 to issue a stationary warning. The stationary warning is a warning that urges the operator to run the stationary recovery mode. For example, the ECU 50 turns on a warning lamp. When the operator receives the stationary warning, the operator, for example, discontinues the working and, when necessary, moves the working vehicle mounting thereon the engine 1 from the working spot to another spot. The operator thereafter inputs a stationary recovery instruction through the stationary recovery button 16. When the stationary recovery instruction is input, the stationary recovery mode is started.

The EGR (exhaust gas recirculation) can be conducted in the self-recovery mode. On the other hand, the EGR cannot be conducted in the assist recovery mode, the reset recovery mode, the stationary recovery mode, and the recovering recovery mode. In these control modes, the total injection amount is increased and the generation amount of the unburned hydrocarbon is also increased. The EGR is not conducted in these control modes to prevent the unburned hydrocarbon from adhering to the EGR pipe 8.

Figure 5:
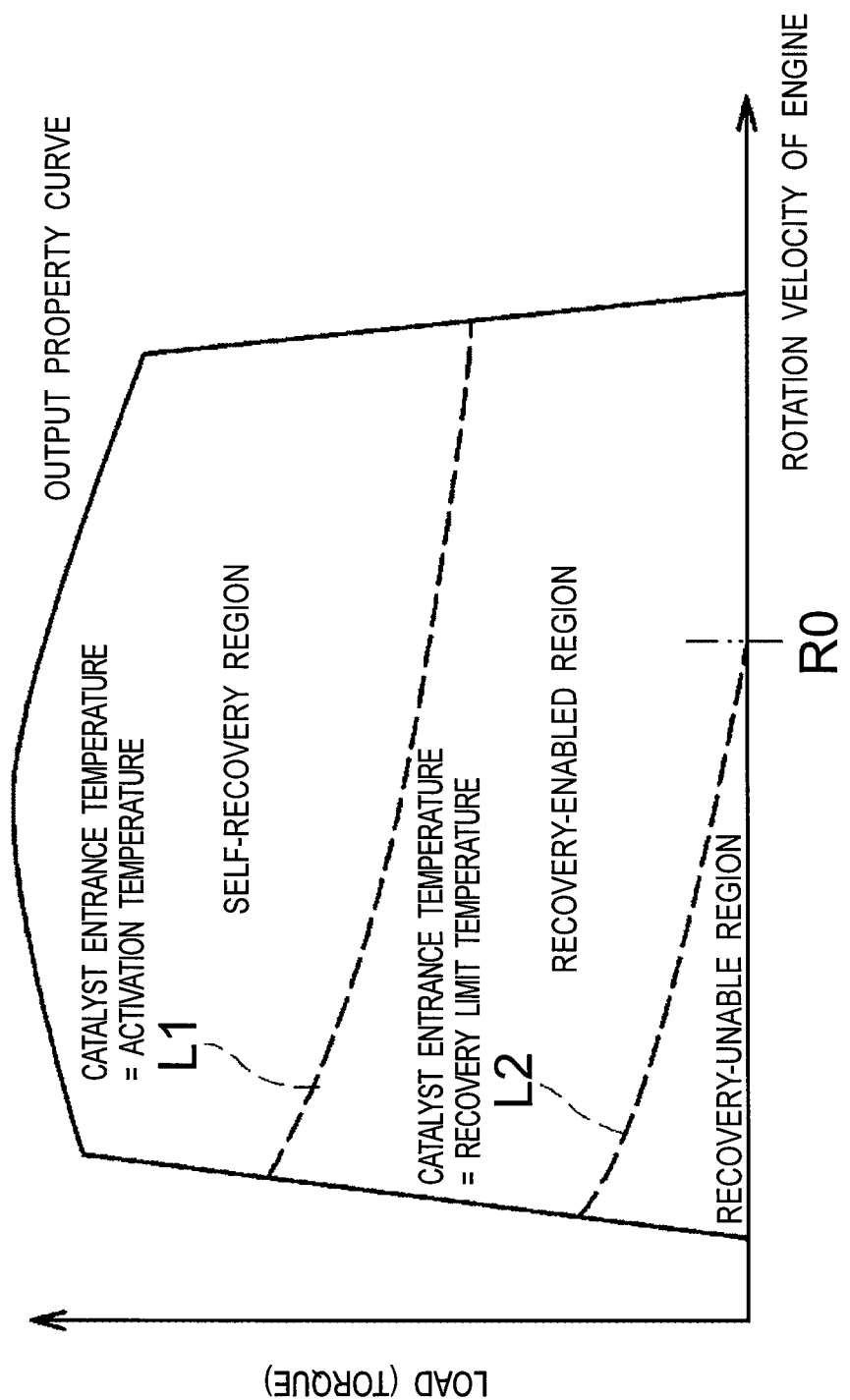
FIG. 5 is a diagram of a self-recovery region, a recovery-enabled region, and a recovery-unable region.

FIG. 5 is a diagram of a self-recovery region, a recovery-enabled region, and a recovery-unable region. In an example depicted in FIG. 5, the axis of abscissa represents the rotation velocity of the engine 1 and the axis of ordinate represents the load (the torque). FIG. 5 depicts an output property curve of the engine 1. The region in the output property curve is divided into the self-recovery region, the recovery-enabled region, and the recovery-unable region. A first border line L1 represents the border between the self-recovery region and the recovery-enabled region. A second border line L2 represents the border between the recovery-enabled region and the recovery-unable region. The first border line L1 represents the rotation velocity-torque curve acquired when the catalyst entrance temperature during the ordinary operation is the activation temperature (300° C.). The self-recovery region represents the region within which the catalyst entrance temperature is equal to the activation temperature or higher. When the rotation velocity and the torque are in the self-recovery region, the filter 19 is recovered without conducting any special control. The self-recovery region represents the region within which the filter 19 is always recovered in the self-recovery mode. The second border line L2 represents the rotation velocity-torque curve acquired when the catalyst entrance temperature during the ordinary operation is equal to the recovery limit temperature. Running the reset recovery mode increases the catalyst entrance temperature. In the case where the catalyst entrance temperature during the ordinary operation is excessively low, however, the catalyst entrance temperature does not reach the activation temperature even when the reset recovery mode is run. The recovery limit temperature represents the lower limit value of the catalyst entrance temperature capable of reaching the activation temperature. The recovery-enabled region represents the region within which the catalyst entrance temperature is lower than the activation temperature and is equal to the recovery limit temperature or higher. In the case where the rotation velocity and the torque are within the recovery-enabled region, the filter 19 can be recovered when the assist recovery mode or the reset recovery mode is run. The recovery-unable region represents the region within which the catalyst entrance temperature is lower than the recovery limit temperature. In the case where the rotation velocity and the torque are within the recovery-unable region, the filter 19 cannot be recovered even when either the assist recovery mode or the reset recovery mode is run.

With reference to FIG. 5, in the stationary recovery mode, the rotation velocity is maintained at a predetermined rotation velocity R0. In the example depicted in FIG. 5, when the rotation velocity is equal to the predetermined rotation velocity R0 or higher, no recovery-unable region is present. In the stationary recovery mode, the catalyst entrance temperature therefore always reaches the activation temperature and the filter 19 is always recovered. The predetermined rotation velocity R0 is identified based on the output property curve experimentally acquired and depicted in FIG. 5.

Figure 6:
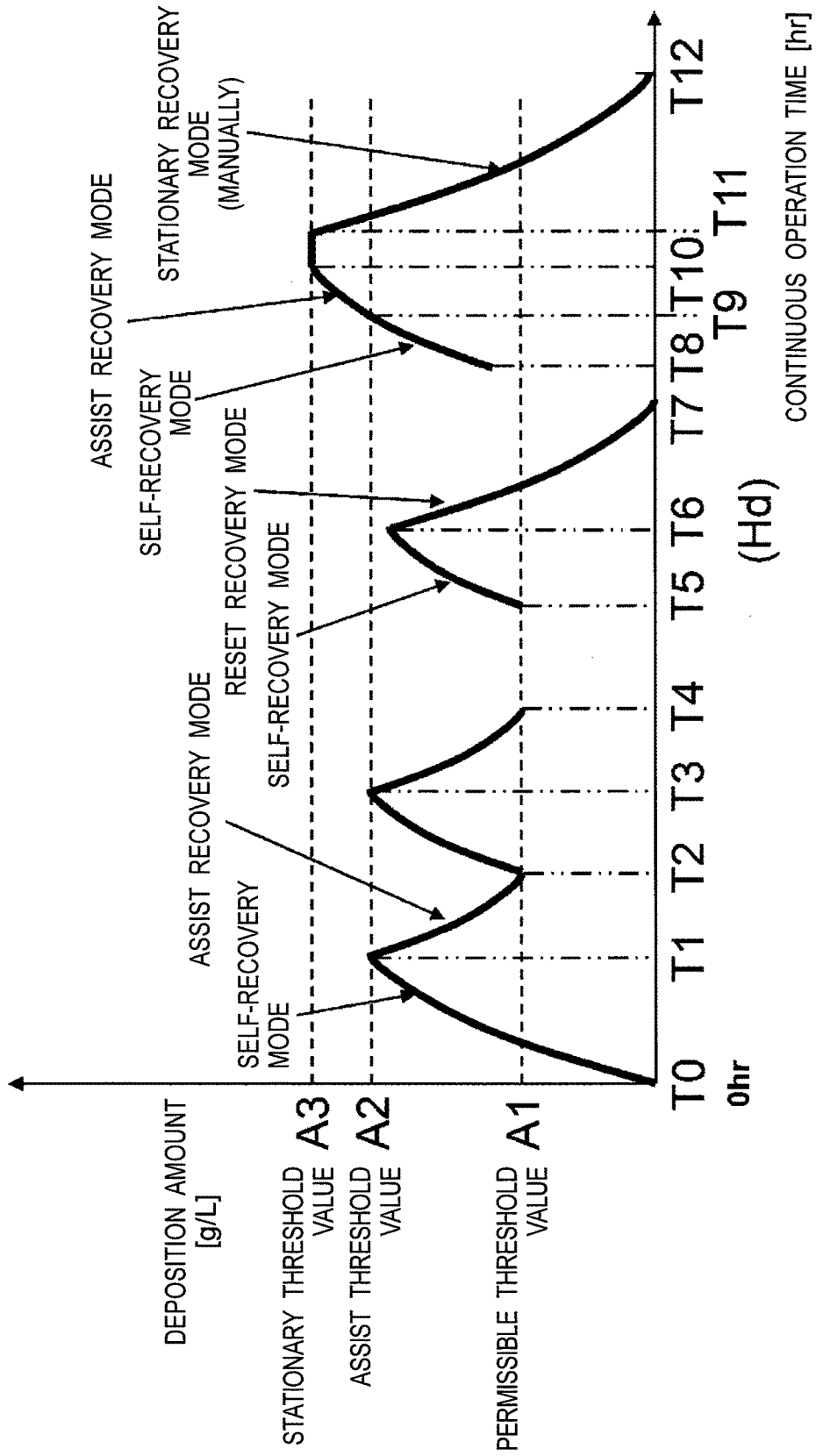
FIG. 6 is a diagram of an example of variation over time of a deposition amount.

FIG. 6 is a diagram of an example of variation over time of the deposition amount. The example of the variation over time of the deposition amount corresponding to the change of the control mode will be described with reference to FIG. 6. In FIG. 6, the axis of abscissa represents a continuous operation time period (hr) of the engine 1 and the axis of ordinate represents the deposition amount (g/L). Taking into consideration the convenience in the description, the temporal difference due to the delay of the control is ignored.

The self-recovery mode (the ordinary operation) is conducted from a time T0 to a time T1 and the deposition amount is increased. At the time T1, the deposition amount reaches an assist threshold value A2 (8 g/L) and the control mode is changed from the self-recovery mode to the assist recovery mode. The fact that the deposition amount is equal to the assist threshold value A2 or larger is one of the starting conditions of the assist recovery mode. From the time T1 to a time T2, the deposition amount is reduced due to the control of the assist recovery mode. At the time T2, the deposition amount reaches a permissible threshold value A1 (6 g/L) and the control mode is changed from the assist recovery mode to the self-recovery mode. The fact that the deposition amount becomes smaller than the permissible threshold value A1 is one of the starting conditions for the self-recovery mode. From the time T2 to a time T3, the self-recovery mode is run and the deposition amount is increased. From the time T3 to a time T4, the assist recovery mode is run and the deposition amount is reduced. In this manner, the self-recovery mode and the assist recovery mode are basically run alternately. As a result, any increase of the deposition amount is suppressed.

A time T5 represents a time later than the time T4. From the time T5 to a time T6, the self-recovery mode is run and the deposition amount is increased. At the time T6, the continuous operation time period reaches a permissible continuous time period Hd (100 hours) and the control mode is changed from the self-recovery mode to the reset recovery mode. The fact that the continuous operation time period exceeds the permissible continuous time period Hd is one of the starting conditions of the reset recovery mode. From the time T6 to a time T7, the reset recovery mode is run and the deposition amount is significantly reduced to substantially be zero. When the reset recovery mode comes to an end, the continuous operation time period is reset to be zero hour. The time T0 and the time T6 are the times at which the continuous operation time period is zero hour.

A time T8 represents a time later than the time T7. From the time T8 to a time T9, the control mode is maintained to be the self-recovery mode and the deposition amount is increased. At a time T9, the deposition amount reaches the assist threshold value A2 (8 g/L) and the control mode is changed from the self-recovery mode to the assist recovery mode. From the time T9 to a time T10, the control mode is maintained to be the assist recovery mode. Though the assist recovery mode is run, the deposition amount is however increased. As above, for example, this state occurs when the rotation velocity is low. At the time T10, the deposition amount therefore reaches a stationary threshold value A3 (10 g/L) and the control mode is changed from the assist recovery mode to the stationary stand-by mode. In the stationary stand-by mode, the stationary warning is issued. In response to the stationary warning, for example, the operator determines to discontinue the work to run the stationary recovery mode. At a time T11, a stationary recovery mode order is manually input and the control mode is changed from the stationary stand-by mode to the stationary recovery mode. From the time T11 to a time T12, the stationary recovery mode is run and the deposition amount is significantly reduced to be smaller than the permissible threshold value A1 (6 g/L).

Figure 7:
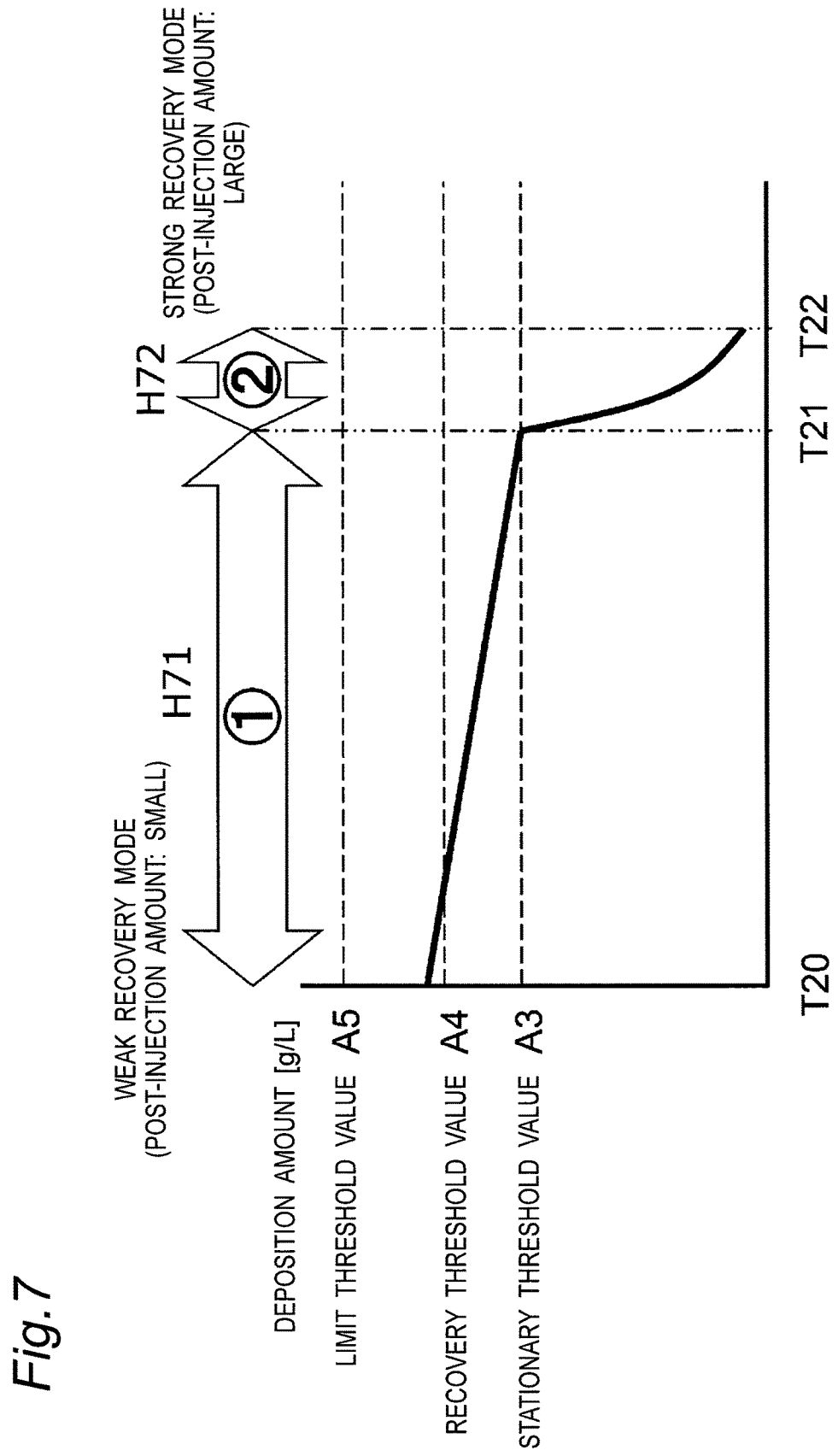
FIG. 7 is a diagram of variation of the deposition amount caused by a recovering recovery operation.

FIG. 7 is a diagram of variation of the deposition amount in the recovering recovery mode. The recovering recovery mode is run when the deposition amount exceeds a recovery threshold value A4. The recovering recovery mode consists of a weak recovery mode and a strong recovery mode. The weak recovery mode is first run and the strong recovery mode is then run as the control mode. In FIG. 7, from a time T20 to a time T21, the weak recovery mode is run and, from the time T21 to a time T22, the strong recovery mode is run.

The recovering recovery mode will be described with reference to FIG. 7. The filter 19 is usually recovered securely when the control mode is changed to the stationary recovery mode. The change to the stationary recovery mode is however manually conducted. The deposition amount therefore becomes excessive when the driving of the engine 1 is continued without running the stationary recovery mode. The PM on the filter 19 may combust in a chain reaction when the reset recovery mode or the stationary recovery mode is run in the case where the deposition amount is excessive. This combustion in a chain reaction will hereinafter be referred to as "abrupt recovery". A large amount of heat is generated associated with the abrupt recovery and the filter 19 may therefore be melted or broken by the large amount of heat. The recovering recovery mode is then provided as a control mode to recover the filter 19 when the excessive deposition occurs. The recovering recovery mode is provided to reduce the deposition amount without causing any abrupt recovery.

The excessive deposition amount means that the deposition amount exceeds the recovery threshold value A4 (12 g/L). The recovery threshold value A4 (12 g/L) is set as follows. The abrupt recovery tends to occur as the deposition amount increases and/or the filter entrance temperature increases. The recovery threshold value A4 (12 g/L) is set to be a value with which no abrupt recovery occurs even when the filter entrance temperature is a temperature (1,000° C.) that is sufficiently higher than the stationary aimed temperature (600° C.). No abrupt recovery therefore does not occur even when the stationary recovery mode is run in the case where the deposition amount is equal to the recovery threshold value A4 (12 g/L) or smaller. A limit threshold value A5 (16 g/L) is set as the upper limit value of the deposition amount for which the recovering recovery can be conducted. The limit threshold value A5 (16 g/L) is a value higher than the recovery threshold value A4 (12 g/L) and is set such that no abrupt recovery occurs when the filter entrance temperature is equal to a recovery aimed temperature (450° C.). The recovering recovery can be conducted during a time period during which the deposition amount is smaller than the limit threshold value A5 even when the deposition amount exceeds the recovery threshold value A4.

The weak recovery mode is a control mode to reduce the deposition amount to an amount equal to the stationary threshold value A3. In the weak recovery mode, the fuel injection pattern is set to increase the filter entrance temperature, the intake air reduction is used, and the aimed rotation velocity is maintained at the predetermined rotation velocity (2,200 rpm). The control conditions of the weak recovery mode are similar to the control conditions of the stationary recovery mode. The stationary recovery mode is set aiming at quickly reducing the deposition amount. On the other hand, the weak recovery mode is set aiming at mildly recovering the filter 19 until the deposition amount reaches the recovery threshold value A4 to avoid any occurrence of the abrupt recovery. The control conditions in the weak recovery mode are set such that the filter entrance temperature reaches the recovery aimed temperature (450° C.) that is somewhat higher than the combustion temperature (400° C.). The recovery aimed temperature (450° C.) is a temperature lower than the stationary aimed temperature (600° C.). The post-injection amount in the weak recovery mode is therefore set to be smaller than the post-injection amount in each of the reset recovery mode and the stationary recovery mode.

Though the limit threshold value A5 can be increased by reducing the recovery aimed temperature, the reduction of the recovery aimed temperature causes an increase of the running time period of the weak recovery mode. The level of the recovery aimed temperature (450° C.) is therefore set such that the longest running time period H71 of the weak recovery mode is a practical running time period. In this embodiment, the longest running time period H71 of the weak recovery mode is three hours while the longest running time period H71 may be a time period other than three hours.

Similarly to the stationary recovery mode, the strong recovery mode is a control mode to quickly recover the filter 19. In the strong recovery mode, the fuel injection pattern is set to increase the filter entrance temperature, the intake air reduction is used, and the aimed rotation velocity is maintained at the predetermined rotation velocity (2,200 rpm). The control conditions of the strong recovery mode are same as the control conditions of the stationary recovery mode. Because the deposition amount is reduced to be lower than the recovery threshold value A4 (12 g/L) by running the weak recovery mode, the strong recovery mode same as the stationary recovery mode can be run.

In this embodiment, the running time period of the strong recovery mode is set to be a predetermined time period H72 (30 minutes) similarly to the running time period of the stationary recovery mode.

The recovery stand-by mode is a control mode that is run to stand by until the recovering recovery mode is run. When the deposition amount exceeds the recovery threshold value A4, the control mode is changed to the recovery stand-by mode. Similarly to the stationary stand-by mode, the recovery stand-by mode is provided to stand by until an order is output from the operator. In the recovery stand-by mode, the ECU 50 activates the warning device 15 to issue a recovery warning. The recovery warning is a warning to urge the operator to run the recovering recovery mode. For example, the ECU 50 turns on a warning lamp. Similarly to the case of the stationary warning, based on the recovery warning, the operator inputs a recovering recovery instruction through the recovering recovery button 17. When the recovering recovery instruction is input, the recovering recovery mode is started.

Figure 8:
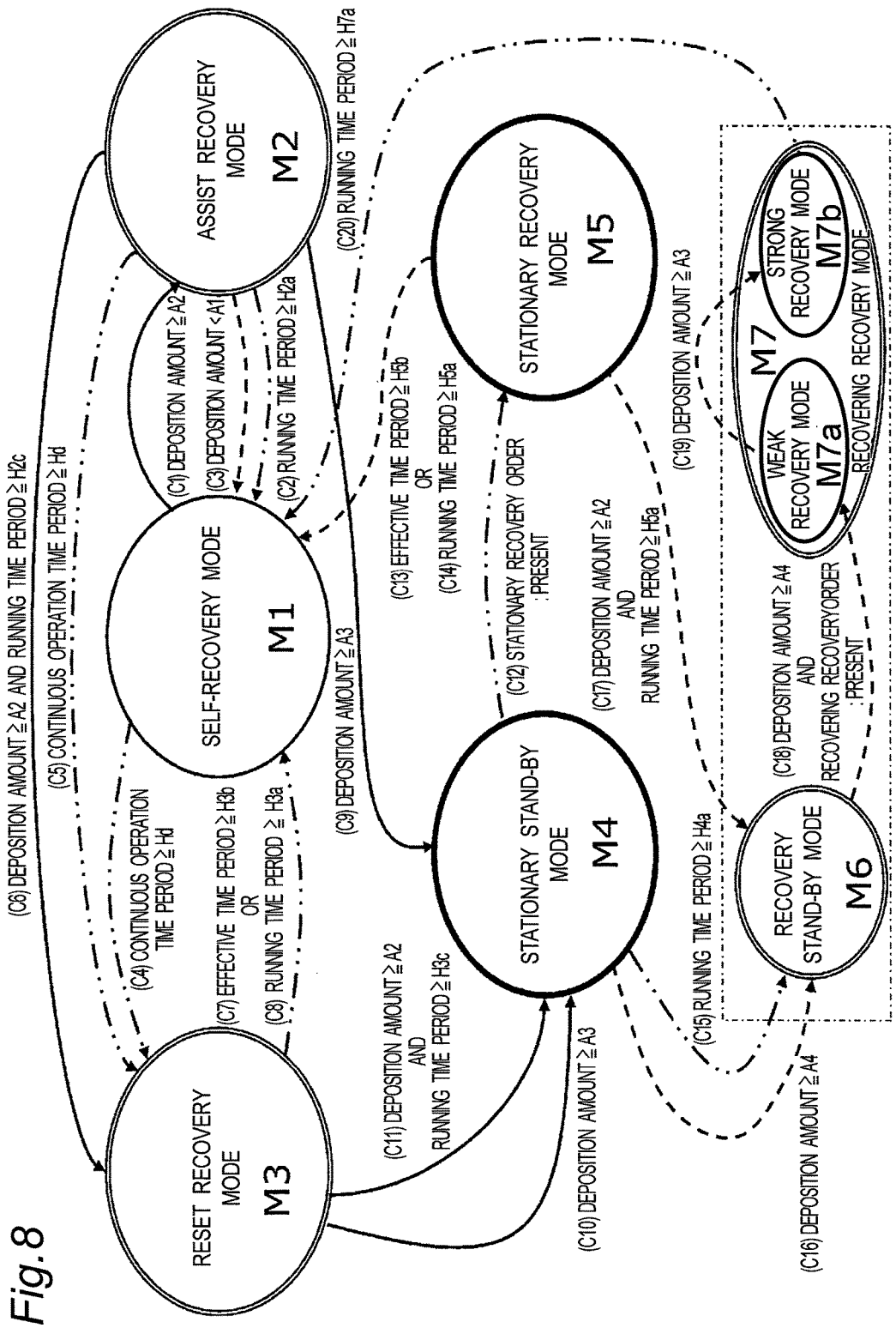
FIG. 8 is a flowchart of transitions among control modes.

FIG. 8 is a flowchart of transitions among control modes. In FIG. 8, the ECU 50 selects as the control mode any one of the self-recovery mode M1, the assist recovery mode M2, the reset recovery mode M3, the stationary stand-by mode M4, the stationary recovery mode M5, the recovery stand-by mode M6, and the recovering recovery mode M7. Each of the control modes is started when predetermined starting conditions are satisfied, and comes to an end to be switched to another control mode when predetermined ending conditions are satisfied. The transition of the control mode basically occurs associated with an increase or a decrease of the deposition amount.

In FIG. 8, conditions indicated by solid lines and dotted lines include determination conditions of the deposition amount. As above, the estimation of the deposition amount is conducted based on the calculation-based estimation method and the differential pressure-based estimation method. When the deposition amount increases, the precision of the estimation by the differential pressure-based estimation method is degraded and the differential pressure-based estimation method is therefore not used when the deposition amount is relatively large. On the other hand, when the deposition amount is relatively small, both of the calculation-based estimation method and the differential pressure-based estimation method are used. The solid line arrows indicate the cases where both of the calculation-based estimation method and the differential pressure-based estimation method are used. The dotted line arrows indicate the cases where only the calculation-based estimation method is used. Conditions indicated by dashed-two dotted lines represent the determination conditions for those other than the deposition amount.

When the engine 1 is started up, the self-recovery mode M1 is first selected as the control mode.

When a condition C1 is satisfied in the self-recovery mode M1, the control mode is changed from the self-recovery mode M1 to the assist recovery mode M2. The condition C1 is "the deposition amount≥the assist threshold value A2 (8 g/L)". When a condition C2 or a condition C3 is satisfied in the assist recovery mode M2, the control mode is changed from the assist recovery mode M2 to the self-recovery mode M1. The condition C2 is "the running time period of the assist recovery mode M2≥the predetermined time period H2a (30 minutes)". The condition C3 is "the deposition amount<the permissible threshold value A1 (6 g/L)".

When a condition C4 is satisfied in the self-recovery mode M1, the control mode is changed from the self-recovery mode M1 to the reset recovery mode M3. The condition C4 is "the continuous operation time period≥the permissible continuous time period Hd (100 hours)". When a condition C5 or a condition C6 is satisfied in the assist recovery mode M2, the control mode is changed from the assist recovery mode M2 to the reset recovery mode M3. The condition C5 is "the continuous operation time period≥the permissible continuous time period Hd (100 hours)". The condition C6 is "the deposition amount≥the assist threshold value A2 (8 g/L) and the running time period of the assist recovery mode M2≥the predetermined time period H2c (10 minutes)". When a condition C7 or a condition C8 is satisfied in the reset recovery mode M3, the control mode is changed from the reset recovery mode M3 to the self-recovery mode M1. The condition C7 is "the effective time period of the reset recovery mode≥the predetermined time period H3b (25 minutes)". The effective time period of the reset recovery mode M3 is a time period during which the filter entrance temperature during the running of the reset recovery mode M3 is maintained at the reset aimed temperature (600° C.) or higher. The ECU 50 measures the effective time period based on the detection information of the filter entrance temperature sensor 35. The condition C8 is "the running time period of the reset recovery mode≥the predetermined time period H3a (30 minutes)".

When a condition C9 is satisfied in the assist recovery mode M2, the control mode is changed from the assist recovery mode M2 to the stationary stand-by mode M4. The condition C9 is "the deposition amount≥the stationary threshold value A3 (10 g/L)". When a condition C10 or a condition C11 is satisfied in the reset recovery mode M3, the control mode is changed from the reset recovery mode M3 to the stationary stand-by mode M4. The condition C10 is "the deposition amount≥the stationary threshold value A3 (10 g/L)". The condition C11 is "the deposition amount≥the assist threshold value A2 (8 g/L) and the running time period of the reset recovery mode≥the predetermined time period H3c (10 minutes)".

When a condition C12 is satisfied in the stationary stand-by mode M4, the control mode is changed from the stationary stand-by mode M4 to the stationary recovery mode M5. The condition C12 is "the stationary recovery mode order: present" and is a condition that the operator inputs the stationary recovery instruction through the stationary recovery button 16.

When a condition C31 or a condition C14 is satisfied in the stationary recovery mode M5, the control mode is changed from the stationary recovery mode M5 to the self-recovery mode M1. The condition C13 is "the effective time period of the stationary recovery mode M5≥the predetermined time period H5b (25 minutes)". The effective time period of the stationary recovery mode M5 is a time period during which the filter entrance temperature in the stationary recovery mode M5 is maintained at the stationary aimed temperature (600° C.) or higher. The condition C14 is "the running time period of the stationary recovery mode M5≥the predetermined time period H5a (30 minutes). In the stationary recovery mode M5, the rotation velocity is maintained at the predetermined rotation velocity (2,200 rpm) and the condition C13 is therefore satisfied except the case where the outer atmosphere temperature is especially low.

When a condition C15 or a condition C16 is satisfied in the stationary stand-by mode M4, the control mode is changed from the stationary stand-by mode M4 to the recovery stand-by mode M6. The condition C15 is "the running time period of the stationary stand-by mode M4≥the predetermined time period H4a (10 hours)". The condition C16 is "the deposition amount≥the recovery threshold value A4 (12 g/L). When a condition C17 is satisfied in the stationary recovery mode M5, the control mode is changed from the stationary recovery mode M5 to the recovery stand-by mode M6. The condition C17 is "the deposition amount≥the assist threshold value A2 (8 g/L) and the running time period of the stationary recovery mode the predetermined time period H5a (30 minutes)".

When a condition C18 is satisfied in the recovery stand-by mode M6, the control mode is changed from the recovery stand-by mode M6 to the weak recovery mode M7a of the recovering recovery mode M7. The condition C18 is "the recovering recovery order: present" representing a condition that the operator inputs the recovering recovery instruction through the recovering recovery button 17. When a condition C19 is satisfied in the weak recovery mode M7a, the control mode is changed from the weak recovery mode M7a to the strong recovery mode M7b. The condition C19 is "the deposition amount≥the stationary threshold value A3 (10 g/L)". When a condition C20 is satisfied in the strong recovery mode M7b, the control mode is changed from the strong recovery mode M7b of the recovering recovery mode M7 to the self-recovery mode M1. The condition C20 is "the running time period of the recovering recovery mode≥the predetermined time period H72 (30 minutes)".

The exhaust gas purifying apparatus according to this embodiment achieves the following effects by the following configurations.

(1) The exhaust gas purifying apparatus according to this embodiment includes the oxidative catalyst 18 and the filter 19 that are disposed in the exhaust gas path 5 of the engine 1, the fuel injecting device 13 that injects fuel according to the fuel injection pattern, and the control device (the ECU 50) that is configured to estimate the deposition amount of the particulate matter and set the fuel injection pattern. When the recovering recovery mode is run, the fuel injection pattern including the post-injection is set to recover the filter 19. The recovering recovery mode consists of the weak recovery mode that is run when the deposition amount is relatively large, and the strong recovery mode that is run when the deposition amount is relatively small. The post-injection amount in the weak recovery mode is smaller than the post-injection in the strong recovery mode.

In this embodiment, when the fuel injection pattern including the post-injection is set to recover the filter 19 (when the recovering recovery mode is run), the post-injection amount is discontinuously varied in two stages. The post-injection may be varied in multiple stages of three or more stages, or the post-injection amount may continuously be reduced. When the fuel injection pattern including the post-injection is set to recover the filter 19, the fuel injection pattern may only be set to reduce the post-injection amount as the deposition amount increases.

Due to the above configuration, the temperature of the exhaust gas flowing through the filter 19 (the filter entrance temperature) is reduced as the deposition amount increases. The combustion with oxygen becomes more difficult to occur as the deposition amount increases. The large amount of heat is difficult to be generated in the filter when the deposition amount is large. The combustion with oxygen more easily occurs as the deposition amount reduces. The filter 19 is therefore quickly recovered when the deposition amount is small.

The exhaust gas purifying apparatus according to this embodiment can efficiently recover the filter 19 suppressing any generation of the large amount of heat in the filter 19.

(2) The post-injection amount is set to be the weak injection amount when the deposition amount is larger than the reference threshold value (the stationary threshold value A3). The post-injection amount is set to be the strong injection amount that is lager than the weak injection amount when the deposition amount is equal to the reference threshold value or smaller.

The post-injection amount is discontinuously varied in the two stages. The post-injection amount may be varied in multiple stages of three or more stages. Compared to the case where the post-injection amount is continuously varied, the fuel injection pattern can relatively easily be determined in the case where the post-injection amount is discontinuously varied in the two stages.

The exhaust gas purifying apparatus according to this embodiment can therefore reduce the load necessary for the control thereof.

(3) When the fuel injection pattern is set after the deposition amount exceeds the starting threshold value (the recovery threshold value A4) that is larger than the reference threshold value (the stationary threshold value A3), the fuel injection pattern is set such that the post injection amount is reduced as the deposition amount increases. When the fuel injection pattern is set before the deposition amount exceeds the starting threshold value, the post-injection amount is maintained at a constant value regardless of the magnitude of the deposition amount.

The possibility that a large amount of heat is generated in the filter becomes higher as the deposition amount increases. In this embodiment, the post-injection amount is varied corresponding to the deposition amount only when the deposition amount exceeds the starting threshold value. The post-injection amount is not varied corresponding to the deposition amount when the deposition amount does not exceed the starting threshold value. The magnitude of the post-injection amount is not varied when the possibility is low that the large amount of heat is generated in the filter.

The exhaust gas purifying apparatus according to this embodiment can therefore reduce the load necessary for the control thereof.

(4) The post-injection is prohibited when the deposition amount is equal to the limit threshold value A5 or larger, that is larger than the starting threshold value (the recovery threshold value A4).

The exhaust gas purifying apparatus according to this embodiment can therefore prevent any generation of the large amount of heat in the filter 19.

(5) The value of the post-injection amount is set to be the value with which the time period for the deposition amount to be reduced from the starting threshold value (the recovery threshold value A4) to the reference threshold value (the stationary threshold value A3) is three hours or shorter.

The exhaust gas purifying apparatus according to this embodiment can therefore recover the filter 19 in a relatively short time period. The exhaust gas purifying apparatus included in the present invention can otherwise be described as follows.

The exhaust gas purifying apparatus included in the present invention includes:

the fuel injecting device 13 that injects fuel;

the oxidative catalyst 18 and the filter 19 that are disposed in the exhaust gas path 5;

the storing unit 80 that has the plural fuel injection patterns stored therein and that has each of the plural fuel injection patterns stored therein correlating the pattern with the conditions under which the fuel injection sessions are conducted in the fuel injection pattern; and the control device (the ECU) 50 that can estimate the deposition amount of the particulate matter depositing on the filter 19, that selects one fuel injection pattern from the plural fuel injection patterns based on the information stored in the storing unit 80, and that causes the fuel injecting device 13 to conduct the fuel injection sessions in the one fuel injection pattern, wherein the plural fuel injection patterns include the first post-injection presence pattern (the post-injection presence pattern in the recovering recovery mode) that conducts the post-injection, wherein the first post-injection presence pattern causes the injection amount of the post-injection to vary based on the deposition amount of the particulate matter estimated by the control device 50, and wherein when the strong injection amount (the injection amount of the post-injection in the recovering strong recovery mode) is injected in the post injection, the deposition amount of the particulate matter estimated by the control device 50 is smaller than the deposition amount of the particulate matter estimated by the control device 50 when a weak injection amount (the injection amount of the post-injection in the recovering weak recovery mode) is injected that is smaller than the strong injection amount in the post-injection.

According to the present invention, the plural fuel injection patterns may include a number to be any natural number, of first post-injection presence pattern(s) and, in each of the first post-injection presence patterns, any natural number of injection amount(s) may be present that can each be injected in the post injection and that are each different from each other or, in each of the first post-injection presence patterns, an infinite number of injection amount(s) may consecutively be present that can each be injected in the post injection and that are each different from each other.

In one embodiment, the weak injection amount of fuel is injected when the deposition amount estimated by the control device 50 is larger than the reference threshold value (the stationary threshold value A3), or equal to the reference threshold value (the stationary threshold value A3) or larger and, on the other hand, the strong injection amount of fuel is injected when the deposition amount estimated by the control device 50 is smaller than the reference threshold value (the stationary threshold value A3) or smaller, or is smaller than the reference threshold value (the stationary threshold value A3).

The case corresponding to the case where the deposition amount estimated by the control device is larger than the reference threshold value is the case where the deposition amount estimated by the control device is equal to the reference threshold value or smaller. The case corresponding to the case where the deposition amount estimated by the control device is equal to the reference threshold value or larger is the case where the deposition amount estimated by the control device is smaller than the reference threshold value.

In one embodiment: the plural fuel injection patterns include the second post-injection presence pattern that conducts the post-injection; and the second post-injection presence pattern is adapted to vary the injection amount of the post-injection based on the deposition amount of the particulate matter estimated by the control device when the deposition amount estimated by the control device is larger than the starting threshold value (the recovery threshold value A4) that is larger than the reference threshold value or is equal to the starting threshold value or larger; the deposition amount of the particulate matter estimated by the control device when a large injection amount is injected in the post injection is smaller than the deposition amount of the particulate matter estimated by the control device when a small injection amount smaller than the large injection amount is injected in the post-injection; and, on the other hand, the injection amount of the post-injection may be set to be constant when the deposition amount estimated by the control device is equal to the starting threshold value or smaller, or is smaller than the starting threshold value.

The case corresponding to the where the deposition amount estimated by the control device is larger than the starting threshold value that is larger than the reference threshold value is the case where the deposition amount estimated by the control device is equal to the starting threshold value or smaller. The case corresponding to the case where the deposition amount estimated by the control device is equal to the starting threshold value or larger, that is larger than the reference threshold value is the case where the deposition amount estimated by the control device is smaller than the starting threshold value.

In one embodiment, when the deposition amount estimated by the control device is larger than the limit threshold value that is larger than the starting threshold value, the control device may select a fuel injection pattern that does not conduct the post-injection from the plural fuel injection patterns and may cause the fuel injecting device to conduct the fuel injection pattern that does not conduct the post-injection.

In one embodiment, each of the post-injection sessions of all the fuel injection patterns selected when the post-injection sessions are conducted and the deposition amount is equal to the starting threshold value or larger may be adapted to reduce the deposition amount from the starting threshold value to the reference threshold value within three hours.

The following variation can further be employed for the engine 1 according to this embodiment.

In the engine 1, the supercharger 10 and an EGR device (the EGR pipe 8, the EGR throttle valve 9, and the EGR cooler 24) are not essential components. The engine 1 may not include the supercharger 10 and/or the EGR device. When the engine 1 does not include the supercharger 10 and/or the EGR device, the intake air temperature is substantially equal to the environmental temperature and the initial exhaust gas temperature is substantially equal to the catalyst entrance temperature.

In this embodiment, the intake air reduction is conducted and the fuel injection pattern is changed to increase the temperature of the exhaust gas. The exhaust gas reduction may be conducted instead of the intake air reduction or in addition to the intake air reduction. The exhaust gas reduction is conducted by the exhaust gas throttle valve 6.

With reference to FIG. 1, arbitrary one or more sensor(s) may be absent that is/are selected from the environmental temperature sensor 31, the intake air temperature sensor 32, the initial exhaust gas temperature sensor 33, the catalyst entrance temperature sensor 34, the filter entrance temperature sensor 35, the EGR temperature sensor 36, the differential pressure sensor 40, the atmospheric pressure sensor 41, the intake air pressure sensor 42, the initial exhaust gas pressure sensor 43, and the rotation velocity sensor 51.

According to the present invention, a fuel injection pattern may be realizable that includes the pilot injection that is conducted before the pre-injection and that is to facilitate the combustion of the fuel by forming in advance an air-fuel mixture in the combustion chambers. The "pilot injection" is injection effective for the drivability and the reduction of the combustion noises.

It is obvious that a new embodiment can be configured by combining two or more configurations of all the configurations described above.

EXPLANATION OF REFERENCE NUMERALS

1 engine
5 exhaust gas path
13 fuel injecting device
18 oxidative catalyst
19 filter
50 ECU (control device)

The invention claimed is:

1. An exhaust gas purifying apparatus comprising:
an oxidative catalyst and a filter that are disposed in an exhaust gas path of an engine;
a fuel injecting device that injects fuel according to a fuel injection pattern; and
a control device that is configured to estimate a deposition amount of a particulate matter, the control device setting the fuel injection pattern, wherein
the control device is operable to run a first recovery mode and a second recovery mode which are control modes to set the fuel injection pattern including post-injection to recover the filter,
the second recovery mode is run when the estimated deposition amount exceeds a starting threshold value that is larger than a reference threshold value, and in the second recovery mode, a post-injection amount is set to be a first injection amount when the deposition amount is larger than the reference threshold value, and the post-injection amount is set to be a second injection amount that is a larger injection amount than the first injection amount when the deposition amount is equal to the reference threshold value or smaller, and
the first recovery mode is run when the deposition amount exceeds the reference threshold value and is equal to the starting threshold value or smaller, and the post-injection amount is maintained at a constant value regardless of the magnitude of the deposition amount.

2. The exhaust gas purifying apparatus according to claim 1, wherein when the deposition amount is equal to a limit threshold value or larger, that is larger than the starting threshold value, the post-injection is prohibited.

3. The exhaust gas purifying apparatus according to claim 1, wherein in the second recovery mode, the post-injection amount is set such that a time period necessary for the deposition amount to be reduced from the starting threshold value to the reference threshold value is within three hours.

4. The exhaust gas purifying apparatus according to claim 2, wherein in the second recovery mode, the post-injection amount is set such that a time period necessary for the deposition amount to be reduced from the starting threshold value to the reference threshold value is within three hours.

* * * * *